United States Patent [19]

Bijlenga et al.

[11] Patent Number: 4,592,664
[45] Date of Patent: Jun. 3, 1986

[54] LUMINESCENT SENSOR FOR AN OPTICAL TEMPERATURE-MEASURING DEVICE

[75] Inventors: Bo Bijlenga; Bertil Hök; Maria Nilsson, all of Västerås, Sweden

[73] Assignee: ASEA Aktiebolag, Västerås, Sweden

[21] Appl. No.: 598,817

[22] Filed: Apr. 10, 1984

[30] Foreign Application Priority Data

Apr. 12, 1983 [SE] Sweden .................. 8302020

[51] Int. Cl.[4] .................. G01J 5/10; G01K 1/02
[52] U.S. Cl. .................. 374/131; 250/227; 250/458.1; 252/301.4 H
[58] Field of Search .................. 374/131, 130, 152, 159; 250/330, 231 P, 227

[56] References Cited

U.S. PATENT DOCUMENTS

| | | | |
|---|---|---|---|
| 3,626,758 | 12/1971 | Stewart et al. | 374/131 |
| 3,639,765 | 2/1972 | Kleinerman | 250/330 |
| 3,996,472 | 12/1976 | Rabatin | 250/330 X |
| 4,061,578 | 12/1977 | Kleinerman | 250/330 |
| 4,278,349 | 7/1981 | Sander | 374/162 X |
| 4,356,448 | 10/1982 | Brogardh et al. | 250/330 X |
| 4,437,772 | 3/1984 | Samulski | 374/131 X |
| 4,448,547 | 5/1984 | Wickersheim | 374/131 |
| 4,468,771 | 8/1984 | Zhukov et al. | 374/131 |
| 4,473,747 | 9/1984 | Brogardh et al. | 250/231 P |

OTHER PUBLICATIONS

Van Nostrand, Reinhold Co. Ltd., New York, 1977, pp. 9, 12 (Glasser "Crystallography and its Applications". Physical Review B, vol. 10, No. 11, pp. 4560-4567, Dec. 1, 1974 ("Efficient Phonon-Assisted Long-Lifetime $Nd^{3+}$ Fluorescence in $Cs_2NaNdCl_6$", B. C. Tofield et al.).

*Primary Examiner*—Daniel M. Yasich
*Attorney, Agent, or Firm*—Watson, Cole, Grindle & Watson

[57] ABSTRACT

The temperature-measuring transducer of a temperature-measuring system that includes a device for emitting energizing radiation, a temperature-measuring transducer which, upon excitation by the energizing radiation, will emit luminescent light, a detector for detecting the luminescent light emitted by the temperature-measuring transducer, and at least one optical fiber interconnecting the various elements is made of a crystalline sensor material which contains luminescent ions, at least some of these luminescent ions being so located in the crystal lattice of the sensor material that for each of said at least some luminescent ions each immediately adjacent anion substantially shows inversion symmetry in relation to that luminescent ion.

8 Claims, 6 Drawing Figures

LUMINESCENT SENSOR FOR AN OPTICAL TEMPERATURE-MEASURING DEVICE

BACKGROUND OF THE INVENTION

1. Field of the Invention

This invention relates generally to the field of optical temperature-measuring devices, which comprise a mass of luminescent sensor material and optical means to lead excitation light from a source of such light to the mass and to lead luminescent light created in the mass by the excitation light back to a detector. A preferred optical means is at least one optical fiber. The invention is primarily concerned with the nature of the sensor material for such measuring devices.

Optical temperature-measuring devices are a preferred choice in several specific fields of application, for example, where temperature is to be sensed in an environment where there is a high risk of electrical disturbances, an explosion hazard, a high magnetic or electrical field strength or where some other considerations call for an optical fiber or the like as a signal transmission medium. The majority of known temperature sensors for fiber optical measuring devices are based on generating a temperature-related wavelength shift, which has an important practical advantage in permitting their use in situations where there are relatively high attenuations of the light passing through the fibers and the junctions formed thereby. The disadvantage of using such sensors, is that they are relatively complicated and that their construction is relatively expensive.

In this specification the term "light" should be taken to include electromagnetic radiation in the infrared and ultraviolet and not just wavelengths in the visible spectrum.

The present invention solves the above-mentioned problems by using a special class of materials as the sensor material in an optical temperature-measuring device.

2. Description of the Prior Art

In U.S. patent application Ser. No. 480,671, filed on Mar. 31, 1983, in the names of Brogardh, Hök and Ovrén (assigned to the assignee of this application) and in Swedish Pat. No. 431,128 (see corresponding U.S. patent application Ser. No. 498,477, filed on May 26, 1983) (also owned by the same assignee) luminescent transducers are disclosed which are based on sensor materials having atomically localized luminescence centers included as a solid solution in a monocrystalline or amorphous carrier material. This class of sensor materials, as pointed out in the above-mentioned applications, give so-called optical time constants in the range of hundreds of micro-seconds. The measurement of a time constant of the order of hundreds of micro-seconds may be performed in a simple manner employing a single optical fiber, which is thereby utilized both for the transmission of pulses of excitation light to the transducer and for the feedback of the luminescence light from the sensor material. Since the signal content which is indicating the temperature being measured exists in the form of a time constant, the optical construction for the detector equipment is considerably simplified and can thus be less expensive than a detector based on measuring a wavelength displacement. The abovementioned patent applications describe transducers for measuring a number of physical quantities.

OBJECT OF THE INVENTION

One object of the present invention aims to provide an improved composition of sensor material with a well-defined temperature dependence for optical time constant and thereby provide a class of materials which is particularly useful for a luminescent temperature-measuring transducer means in fiber-optic temperature-measuring devices.

SUMMARY OF THE INVENTION

The invention is characterized in that the sensor material of the luminescent temperature-measuring transducer means is crystalline and contains luminescent ions and that these ions are so position in the crystal lattice that each immediately adjacent anion will essentially display inversion symmetry in relation to the luminescent ion.

BRIEF DESCRIPTION OF THE DRAWING

The invention will be exemplified in greater detail, by way of example, with reference to the accompanying drawing, wherein.

DESCRIPTION OF THE PREFERRED EMBODIMENTS

Figure 1:
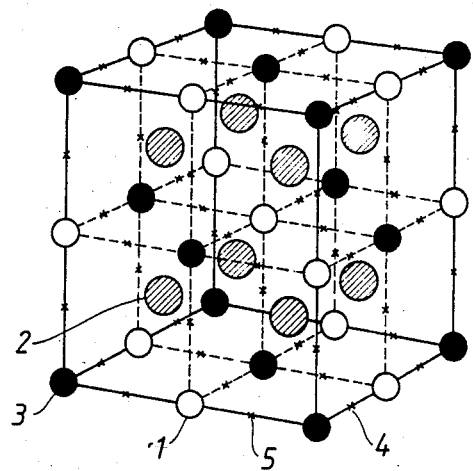
FIG. 1 shows an example of an ionic structural construction of a sensor material according to the invention.

FIG. 1 shows the crystal structure of $Cs_2NaNdCl_6$, according to B. C. Tofield and H. P. Weber, Physical Review B, Vol. 10, No. 11, December 1974, pages 4560–4567. This material contains luminescent neodymium ions, the atomically localized luminescence of which takes place at a plurality of wavelength bands, the strongest being centered at a wavelength of 1.06 micron. In FIG. 1 the neodymium ions are indicated at 1 by unfilled circles. The other ions included in the lattice are $Cs^+$ ions shown as shaded circles 2, $Na^+$ ions shown as filled-in circles 3, and $Cl^-$ ions shown as small crosses at 4.

From FIG. 1 it is clear that each luminescent $Nd^{3+}$ ion 1 has six $Cl^-$ ions 4 as its closest neighbors, these ions 4 lying at the apices of an octahedron with the ion 1 at the center. This symmetric environment around the luminescent neodymium ions results in the optical time constant for the material being long, according to a theory published by H. Y. P. Hong and S. R. Chinn, Mater. Res. Bull. 11 (1976), pages 461–468. This is due to a reduced probability of the luminescent energy transition, which in turn is caused by the crystal symmetry. Deviations from the symmetry may be caused by statistical fluctuations in the positions of the ions in the crystal lattice as a consequence of temperature movements. The range of these movements will increase with increasing temperature. This dependence has been empirically verified. At room temperature for the abovementioned material composition, the optical time constant has been measured to be 1000 $\mu s$ with a temperature dependence of about $-3\mu s/°C$. This sensitivity is capable of providing accuracies, in a complete measurement system, which fulfil industrial application requirements.

In the crystal structure shown in FIG. 1, the sodium and cesium ions 3 and 2 and the chloride ions 4 included therein may, of course, be replaced by other alkali metal ions and halogen ions, respectively. Further, of course, the neodymium ions 1 may be partially replaced by some other, optically inactive, rare-earth metal, for example lanthanum, gadolinium or lutetium. The advantage of this latter arrangment is that a certain phenomenon, known as "concentration quenching", can be avoided. This "concentration quenching" phenomenon results in a decreasing luminescence efficiency at increasing neodymium contents. A more general description of the crystal structure shown in FIG. 1 is then $Aa_2AbNd_xR_{1-x}Ha_6$, where Aa and Ab designate alkali metals, R a rare-earth metal (optically inactive), Ha a Halogen and x designates the neodymium concentration expressed as a mole ratio.

As examples of other non-luminescent metal ions may be mentioned yttrium, scandium, gallium, thallium or indium.

Figure 2A:
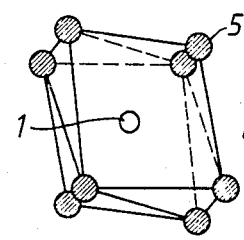
FIG. 2a exemplifies the structural properties which characterize a sensor material with suitable properties.
Figure 2B:
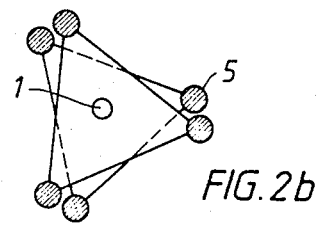
FIG. 2b shows an unsatisfactory structural arrangement.

FIGS. 2a and 2b further illustrate the demands for symmetry of the sensor material in a temperature measuring device. FIG. 2a shows the immediate surroundings of an Nd ion 1 in $Nd_2Sn_2O_7$, where the surrounding $O^{2-}$ ions 5 form a polyhedron which exhibits so-called inversion symmetry. This symmetry property means that each surrounding $O^{2-}$ may be linked to another $O^{2-}$ ion at the same distance from the $Nd^{3+}$ ion 1, but in quite the opposite direction. FIG. 2b shows the structure of $NdAl_3(BO_3)_4$, which completely lacks this inversion symmetry. Thus, $Nd_2Sn_2O_7$ displays an extremely long optical time constant whereas $NdAl_3(BO_3)_4$ has a short, substantially completely temperature-independent time constant.

Crystals with different degrees of inversion symmetry can be classified, for example, according to the nomenclature given by Hermann-Mauguin (see e.g. "Crystallography and its applications" by L. S. Dent Glasser, Wiley, New York, 1977). Inversion symmetry is exhibited by the following so-called point groups as defined by Hermann-Mauguin: $\bar{1}$, 2/m, mmm, 4/m, 4/mmm, $\bar{3}$, $\bar{3}$m, 6/m, 6/mmm, m3, m3m. For the point groups 1, 2, m, 222, mm2, 4, $\bar{4}$, 422, 4mm, $\bar{4}$2m, 3m, 6, 622, 6mm, $\bar{6}$m2, 23, $\bar{4}$3m and 432, the diversion from the inversion symmetry may be small.

Materials belonging to any of the above-noted point groups may, thus, be suitable sensor materials.

A further concrete example of a suitable sensor material is $Ba(R_{0.5-x}Nd_xTa_{0.5})O_3$ with a time constant of about 400 $\mu$s at room temperature.

A further factor which is important for the suitability of a sensor material for a temperature measurement application is the probability of non-radiant energy transitions, for example because of phonon interaction. For the probability of these undesired energy transitions occurring to be as low as possible, it is necessary that the maximum phonon energy be as low as possible (see C. Kittel, "Introduction to Solid State Physics", 3rd Ed., Wiley, New York, 1968). This can be achieved in practice if the elements included in the material all have relatively high atomic numbers. Atoms lighter than lithium—with an atomic number of 3—are therefore not considered suitable to be included in the lattice structure of a good sensor material.

A certain advantage is obtained if the sensor material exists in a mono-crystalline form, since losses due to light scattering in grain boundaries are in that way avoided.

Figure 3A:
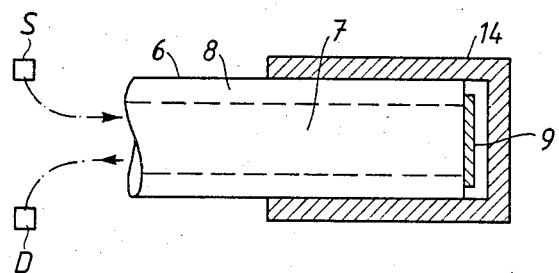
FIGS. 3a, 3b and 3c show examples of three embodiments of transducer using the sensor material of this invention for use with a temperature-measuring device.
Figure 3B:
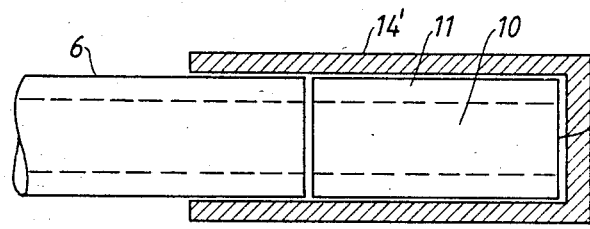
Figure 3C:
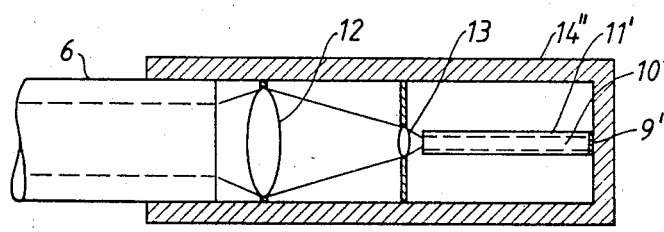

FIGS. 3a to 3c show three different geometrical embodiments of a temperature sensor element according to the invention. Although shown only schematically, and then only in FIG. 3a, each temperature-measuring sensor element would be used with an optical fiber which is used to feed excitation light from a source S to the element and to feed luminescent light created in the element back along the fiber 6 to a detector D. The source S and detector D can be wholly conventional and will not be further described here.

FIG. 3a shows the connecting optical fiber 6 comprising a core 7 and an annular sheath 8, according to known technique, as well as a sensor material in the form of a plate 9 applied against the fiber end. This embodiment is suitable for sensor materials with a high concentration of luminescent ions, for example neodymium ions, which implies a short absorption distance for incident excitation light. Because of the conical propagation of the excitation light from the fiber end, the absorption, in this embodiment, should take place within a distance from the fiber end surface which approximately corresponds to one diameter of the core 7 of the fiber so that there is no need for the longitudinal extension of the sensor material to exceed the diameter of the core 7.

FIG. 3b shows an embodiment which is more suitable for a sensor material having a longer absorption distance (e.g. a sensor material having a lower concentration of luminescent ions). To avoid light losses because of the conical shape of the propagation of light from the fiber end, the sensor material in this embodiment is made in the form of a cylindrical light guide 9', for example a light guide consisting, in the known way, of a core 10 and an annular sheath 11 with a lower refractive index than that of the core 10.

FIG. 3c shows two lens elements 12 and 13 between the fiber 6 and a sensor mass 9" having a core 10' and an annular sheath 11'. Using such lens elements, luminescent light emitted into a larger solid angle can be coupled back into the fiber 6, resulting in a better signal-to-noise ratio during use.

In each of the embodiments 3a–3c an end cap (14 in FIG. 3a, 14' in FIG. 3b, and 14" in FIG. 3c), for example a tube closed at one end, has been provided to protect the sensor material from the effect of external environmental factors, such as moisture, corrosive steams or liquids. The attachment of the end cap to the fiber 6 may be performed by a range of alternative methods, such as shrinking, welding or glueing. The material from which the end cap is made may vary for different applications. However, the demands for diffusion density normally exclude organic materials such as polymers and therefore in most cases end caps of metallic, glass or ceramic materials are preferred.

The invention can be varied in many ways within the scope of the following claims.

What is claimed is:

1. In a fiber-optic temperature-measuring device which comprises means providing energizing radiation, a luminescent temperature-measuring transducer means, a detector means to receive radiation from the transducer means and at least one optical fiber means optically linking the means providing the energizing radiation, the transducer means and the detector means, the improvement wherein the transducer means comprises a crystalline sensor material which contains luminescent neodymium ions, at least some of these luminescent ions being so located in the crystal lattice of the sensor material that for each of said at least some luminescent ions each immediately adjacent anion substantially shows inversion symmetry in relation to that luminescent ion said crystalline sensor material being selected from the group consisting of $Aa_2AbNd_xR_{1-x}Ha_6$, $Aa_5Nd_xR_{1-x}Ab_2Ha_{10}$, $Nd_2Sn_2O_7$ and $Ba(R_{0.5-x}Nd_xTa_{0.5})O_3$, where Aa and Ab are alkali metals, Nd is neodymium, R is an optically inactive rare earth metal, Ha is a halogen, Sn is tin, O is oxygen, Ba is barium, Ta is tantalum, and x designates the concentration of neodymium given as a mole fraction and is greater than zero and less than or equal to one.

2. A fiber-optic temperature-measuring device according to claim 1, wherein said sensor material is a monocrystal.

3. A fiber-optic temperature-measuring device according to claim 1, wherein said optical fiber means includes a straight cylindrical end portion, said straight cylindrical end portion having a certain diameter and defining a longitudinal direction, as well as a free end surface; and wherein said sensor material is located at said free end surface of said straight cylindrical end portion, said sensor material having a thickness in the longitudinal direction of said straight cylinrical end portion which does not substantially exceed said certain diameter of said straight cylindrical end portion.

4. A fiber-optic temperature-measuring device according to claim 1, wherein said sensor material has the shape of a cylindrical light guide, and including a tubular material of a lower refractive index coaxially surrounding said sensor material.

5. A fiber-optic temperature-measuring device according to claim 1, wherein said transducer means includes at least one lens means.

6. A fiber-optic temperature-measuring device according to claim 1, wherein said transducer means comprises at least one end cap surrounding the sensor material and the adjacent end of the optical fiber means.

7. A fiber-optic temperature-measuring device according to claim 6 wherein said end cap is a tube of an inorganic material which is closed at one end.

8. In an optical temperature-measuring device using as the temperature sensing material a crystalline sensor material incorporating luminescent centers, the improvement which comprises employing as the sensor material a material consisting of compounds selected from the group consisting of $Aa_2AbNd_xR_{1-x}Ha_6$, $Aa_5Nd_xR_{1-x}Ab_2Ha_{10}$, $Nd_2Sn_2O_7$ and $Ba(R_{0.5-x}Nd_xTa_{0.5})O_3$, where Aa and Ab are alkali metals, Nd is neodymium, R is an optically inactive rare earth metal, Ha is a halogen, Sn is tin, O is oxygen, Ba is barium, Ta is tantalum, and x designates the concentration of neodymium given as a mole fraction and is greater than zero and less than or equal to one.

* * * * *